(12) United States Patent
Cho et al.

(10) Patent No.: US 7,369,531 B2
(45) Date of Patent: May 6, 2008

(54) APPARATUS AND METHOD FOR TRANSMITTING/RECEIVING A PILOT SIGNAL FOR DISTINGUISHING A BASE STATION IN A COMMUNICATION SYSTEM USING AN OFDM SCHEME

(75) Inventors: Jae-Hee Cho, Seoul (KR); Hoon Huh, Seongnam-si (KR); Soon-Young Yoon, Seongnam-si (KR); Chang-Ho Suh, Seoul (KR); Hyeon-Woo Lee, Suwon-si (KR); Dong-Seek Park, Yongin-si (KR)

(73) Assignee: Samsung Eectronics Co., Ltd (KR)

( * ) Notice: Subject to any disclaimer, the term of this patent is extended or adjusted under 35 U.S.C. 154(b) by 481 days.

(21) Appl. No.: 10/978,794

(22) Filed: Nov. 1, 2004

(65) Prior Publication Data

US 2005/0094613 A1    May 5, 2005

(30) Foreign Application Priority Data

Oct. 31, 2003    (KR) ..................... 10-2003-0077083

(51) Int. Cl.
- H04J 1/00 (2006.01)
- H04J 11/00 (2006.01)
- H04B 7/204 (2006.01)

(52) U.S. Cl. .................. 370/343; 370/319; 370/208

(58) Field of Classification Search ................ 370/343, 370/319, 208
See application file for complete search history.

(56) References Cited

U.S. PATENT DOCUMENTS

| | | | |
|---|---|---|---|
| 6,282,185 B1 * | 8/2001 | Hakkinen et al. | 370/342 |
| 6,728,296 B1 * | 4/2004 | Yung | 375/141 |
| 2004/0131007 A1 * | 7/2004 | Smee et al. | 370/208 |
| 2005/0238083 A1 * | 10/2005 | Laroia et al. | 375/132 |

* cited by examiner

Primary Examiner—Barry Taylor
(74) Attorney, Agent, or Firm—The Farrell Law Firm, PC (57) ABSTRACT

A method for transmitting reference signals in a radio communication system in which a frequency band is divided into a plurality of sub-frequency bands. The reference signals are transmitted through at least one of the plurality of sub-frequency bands, and data signals are transmitted through the plurality of sub-frequency bands except for the at least one of the plurality of sub-frequency bands. The method includes the steps of: determining a reference signal pattern representing positions of the at least one of the plurality of sub-frequency bands through which the reference signals are transmitted in consideration of a preset time and a preset bandwidth; generating the reference signals using a PN code and a Walsh code; and transmitting the reference signals through the sub-frequency bands corresponding to the reference signal pattern.

13 Claims, 7 Drawing Sheets

APPARATUS AND METHOD FOR TRANSMITTING/RECEIVING A PILOT SIGNAL FOR DISTINGUISHING A BASE STATION IN A COMMUNICATION SYSTEM USING AN OFDM SCHEME

PRIORITY

This application claims priority to an application entitled "Apparatus And Method For Transmitting/Receiving Pilot Signal For Distinguishing Base Station In Communication System Using OFDM Scheme" filed in the Korean Intellectual Property Office on Oct. 31, 2003 and assigned Serial No. 2003-77083, the contents of which are incorporated herein by reference.

BACKGROUND OF THE INVENTION

1. Field of the Invention

The present invention relates generally to a communication system using orthogonal frequency division multiplexing (OFDM) scheme, and more particularly to an apparatus and a method for generating a pilot signal (or pilot pattern) for distinguishing a base station.

2. Description of the Related Art

An OFDM scheme has recently been used as a data transmission scheme using multi-carriers for high-speed data transmission in a wired and/or wireless channel. More specifically, the OFDM is a multi-carrier modulation scheme in which symbols input in series are serial-to-parallel converted in order to be modulated into a plurality of sub-carriers being orthogonal to each other, i.e., a plurality of sub channel, which are then transmitted.

The OFDM scheme is widely used in digital transmission technologies, such as digital audio broadcasting (DAB), digital televisions, wireless local area network (WLAN), and wireless asynchronous transfer mode (WATM). That is, conventionally, the OFDM scheme was not widely used due to the complexity of the required hardware, but it has been recently realized because of the development of various digital signal processing technologies including a fast Fourier transform (FFT) and an inverse fast Fourier transform (IFFT).

The OFDM scheme is similar to a conventional frequency division multiplexing (FDM) scheme but can achieve an optimum transmission efficiency because a plurality of sub-carriers are transmitted while maintaining orthogonality between them in the OFDM. That is, the OFDM scheme is efficient in its use of frequencies and is highly resistant to multi-path fading, thereby achieving optimum transmission efficiency in high-speed data transmission.

Further, because the OFDM scheme uses an overlapped frequency spectrum, it is efficient in its use of frequencies and is highly resistant to frequency selective fading and multi-path fading. In addition, the OFDM scheme can reduce inter symbol interference (ISI) influence by utilizing a guard interval and enables the hardware structure of an equalizer to be simply designed. Furthermore, because the OFDM scheme is highly resistant to impulse noise, it has been actively utilized in the structure of a communication system.

Hereinafter, operations of a transmitter and a receiver of a communication system using the OFDM scheme, i.e., an OFDM communication system, will be briefly described.

In the transmitter of the OFDM communication system, input data is modulated into sub-carriers via a scrambler, an encoder, and an interleaver. The transmitter provides various variable data rates and has different code rates, interleaving sizes, and modulation schemes according to the data rates.

Conventionally, the encoder uses a code rate of ½, ¾ etc., and the size of the interleaver for preventing burst error is determined depending on the number of coded bits per symbol (NCBPS). The modulation scheme uses a quadrature phase shift-keying (QPSK) scheme, an 8 phase shift keying (8PSK) scheme, a 16 quadrature amplitude modulation (16QAM) scheme, a 64 QAM scheme, etc.

A predetermined number of pilot sub-carriers are added to a signal modulated into a predetermined number of the sub-carriers by the aforementioned elements. Then, the signal including the pilot sub-carriers passes through an IFFT block to generate an OFDM symbol. A guard interval for eliminating ISI in multi-path channel environments is inserted into the OFDM symbol. The OFDM symbol passes through a symbol waveform generator and is finally input to a radio frequency (RF) processor. The RF processor RF-processes an input signal and sends the processed signal through the air.

The receiver of the OFDM communication system corresponding to the transmitter as described above performs a process inverse to the process performed by the transmitter and has an additional synchronization process. First, the receiver must perform a process in which frequency offset and symbol offset are estimated for the received OFDM symbol by means of a preset training symbol. Then, data symbols from which the guard interval has been eliminated pass through an FFT block and are restored to a predetermined number of sub-carriers including a predetermined number of pilot sub-carriers.

Further, in order to overcome path delay on a radio channel, an equalizer estimates a channel state for a received channel signal and eliminates signal distortion on the radio channel from the received channel signal. Data for which the channel estimation has been performed by the equalizer is converted into a bit sequence, passes through a de-interleaver, and is output as final data via a decoder and a de-scrambler for error correction.

As described above, in an OFDM communication system, a transmitter (i.e., base station) transmits pilot sub-carrier signals (pilot channel) to a receiver (i.e., a terminal). That is, the base station transmits data sub-carrier signals (data channel) and simultaneously transmits the pilot sub-carrier signals. Herein, the pilot sub-carrier signals are transmitted for synchronization acquisition, channel estimation, and base station differentiation.

Further, the pilot signals operate as a kind of training sequence and enable channel estimation to be performed between the transmitter and the receiver. The terminal may differentiate a base station to which the terminal itself belongs using the pilot signals. A position at which the pilot signals are transmitted has been predetermined between the transmitter and the receiver. As a result, the pilot signals operate as a kind of reference signal.

The base station transmits the pilot signals with a relatively high transmission power than that for data signals, which enables the pilot signals to reach even a cell boundary, while the base station enables the pilot signals to have a specific pattern, that is, a pilot pattern.

The high power transmission of the pilot signals, even with a specific pilot pattern, enables the pilot signals to reach the cell boundary. That is, when the terminal enters a cell, the terminal does not have any information on a base station to which the terminal itself currently belongs. Accordingly, in order to detect a base station at which the terminal is currently located, the terminal must use the pilot signals.

Therefore, the base station transmits the pilot signals with relatively high transmission power in order to have a specific pilot pattern, such that the terminal can detect the base station to which the terminal itself belongs.

Further, the pilot pattern is by the pilot signals transmitted from the base station. That is, the pilot pattern is differentiated by a slope of the pilot signals and a starting point at which the pilot signals are transmitted. Accordingly, in the OFDM communication system, in order to enable base stations included in the OFDM communication system to be differentiated from each other, the base stations must be designed to have pilot patterns different from each other.

Further, the pilot pattern is generated based on a coherence bandwidth and a coherence time. Hereinafter, the coherence bandwidth and the coherence time will be described.

The coherence bandwidth represents a maximum bandwidth in which the identity of channels can be assumed on a frequency domain, that is, the invariability of channels can be assumed. The coherence time represents a maximum time for which the identity of channels can be assumed on a time domain, that is, the invariability of channels can be assumed.

As described above, because the identity of channels can be assumed in the coherence bandwidth and the coherence time, even though only a pilot signal is transmitted in the coherence bandwidth and the coherence time, no problem occurs in synchronization acquisition, channel estimation, base station differentiation, etc. Further, because data signals can be maximally transmitted, the entire performance of a system can be improved.

As a result, a minimum frequency separation enabling the transmission of pilot signals is a coherence bandwidth and a minimum time separation (i.e., minimum OFDM symbol time separation), enabling the transmission of the pilot signals is a coherence time.

The number of base stations included in the OFDM communication system is changed according to the size of the OFDM communication system. That is, the number of the base stations increases as the size of the OFDM communication system increases. Accordingly, in order to differentiate the base stations from each other, pilot patterns having different slopes and starting points must exist by the number of the base stations.

However, in order to transmit pilot signals on a time-frequency domain in the OFDM communication system, the coherence bandwidth and the coherence time must be considered as described above. When the coherence bandwidth and the coherence time are considered, the number of the pilot patterns having different slopes and starting points is limited.

When pilot patterns are generated without considering the coherence bandwidth and the coherence time, pilot signals are scattered in pilot patterns representing different base stations. In such a case, it is impossible to distinguish base stations from each other by means of the pilot patterns.

Figure 1:
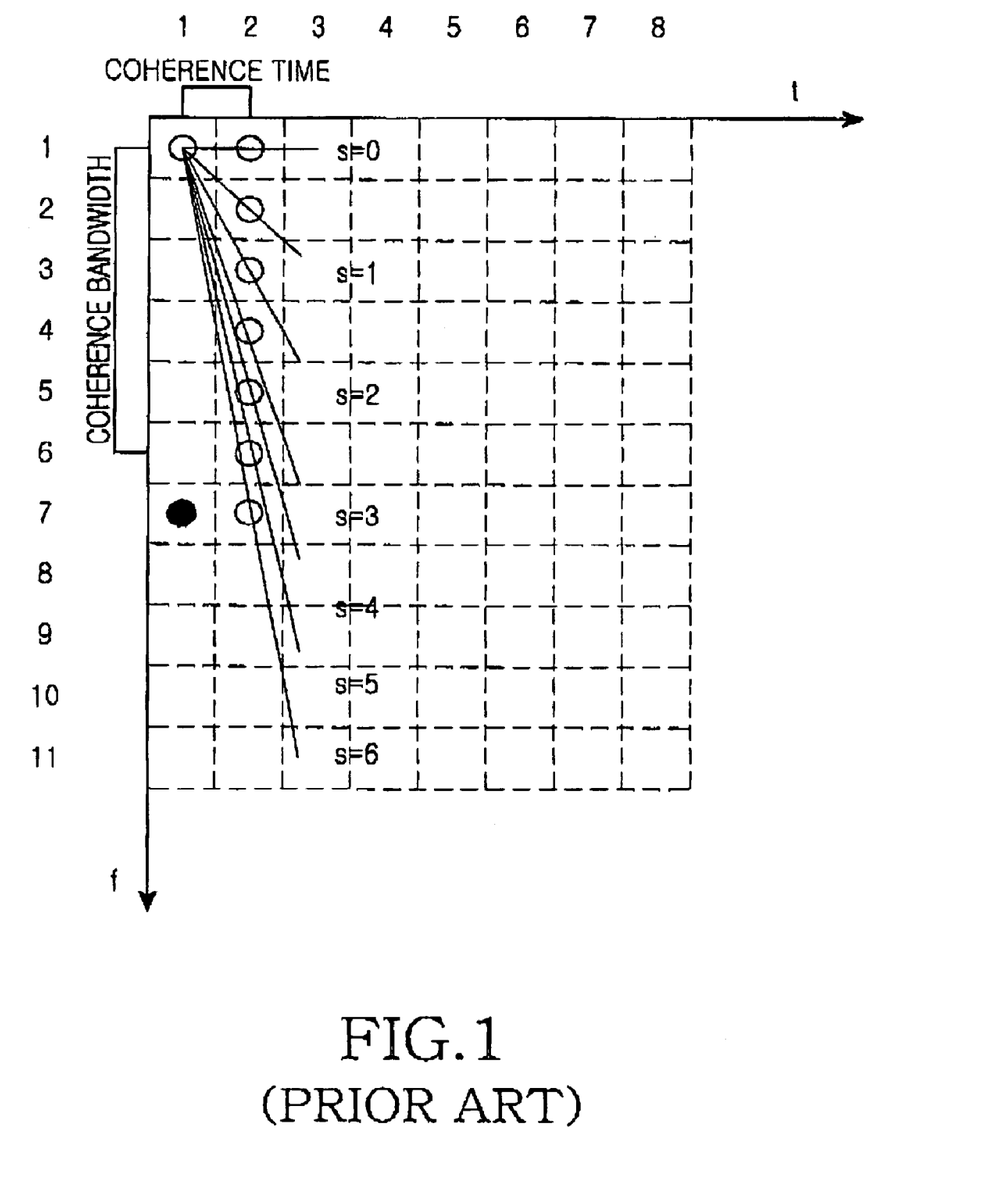
FIG. 1 is a view illustrating possible slopes of pilot patterns in a conventional OFDM communication system.

FIG. 1 is a view illustrating possible slopes of pilot patterns in a conventional OFDM communication system. Referring to FIG. 1, the possible slopes of pilot patterns and the number of the slopes, that is, the slopes and the number of the slopes according to the transmission of a pilot signal, depend on a coherence bandwidth and a coherence time. In a case in which the coherence bandwidth is six and a coherence time slot is 1, when it is assumed that the slope of a pilot pattern has a value of integer, the number of slopes of a pilot pattern capable of being generated under the condition is six from s=0 to s=5. That is, the slope of the pilot pattern capable of being generated under the condition has one integer of 0 to 5. As described above, because the number of slopes of a pilot pattern capable of being generated under the condition is six, the number of base stations capable of being differentiated by means of the pilot pattern is six in the OFDM communication system satisfying the condition.

Hereinafter, a pilot sub-carrier in which the slope of a pilot pattern is six will be described. Actually, because there is no difference between a case (s=0) in which the slope of a pilot pattern is zero and a case in which the slope (s=6) of a pilot pattern is six, only one slope of the two cases can be used. That is, as described above, the pilot sub-carrier in which the slope of the pilot pattern is six is equal to another pilot sub-carrier in which the slope of a pilot pattern spaced the coherence bandwidth apart from the pilot sub-carrier is zero. Therefore, the case where s=0 and the case where s=6 cannot be distinguished from each other.

The circle hatched by oblique lines illustrated in FIG. 1 represents pilot sub-carrier signals spaced by the coherence bandwidth. That is, a case in which the slope of a pilot sub-carrier marked by the white circles is six is equal to a case in which the slope of the pilot sub-carrier marked by the circle having the oblique is zero. Accordingly, the slope of the pilot sub-carrier is limited to the coherence bandwidth.

Herein, all slopes enabling the generation of the pilot pattern can be expressed by Equation (1).

$$S_{val} = \left[0, \ldots, \frac{B_c}{T_c} - 1\right] \quad (1)$$

In Equation (1), $S_{val}$ represents the slope of a pilot pattern capable of being generated in the OFDM communication system. Herein, it is preferred that the slope of the pilot pattern has a value of integer, but it is not always necessary that the slope of the pilot pattern has a value of an integer. Further, in Equation (1), $T_c$ represents a coherence time, that is, the number of basic data units constituting the coherence time on a time domain.

In FIG. 1, a basic data unit included in the coherence time is an OFDM symbol and $T_c$ represents the number of OFDM symbols. Further, in Equation (1), $B_c$ represents a coherence bandwidth, that is, the number of basic sub-carrier units constituting the coherence bandwidth on a frequency domain.

The actual maximum number of slopes enabling the generation of a pilot pattern can be expressed by Equation (2).

$$S_{no\_max} = \frac{B_c}{T_c} \quad (2)$$

In Equation (2), $S_{no\_max}$ represents the maximum number of slopes enabling the generation of the pilot pattern in the OFDM communication system.

Therefore, as described above, because the pilot patterns used to differentiate base stations included in the OFDM communication system in the OFDM communication system are generated depending on the coherence bandwidth and the coherence time, there is a limitation in the number of generable pilot patterns. Accordingly, when the number of the base stations included in the OFDM communication system increases, the number of distinguishable base stations is limited due to the limitation in the number of the generable pilot patterns. Further, because adjacent base stations may have the same pilot patterns, it is impossible to distinguish the base stations from each other. Moreover, it is difficult to exactly estimate a channel due to interference between adjacent cells.

SUMMARY OF THE INVENTION

Accordingly, the present invention has been designed to solve the above and other problems occurring in the prior art, and it is an object of the present invention to provide an apparatus and a method for transmitting/receiving a pilot signal for differentiating base stations from each other in an OFDM communication system.

It is another object of the present invention to provide an apparatus and a method for generating a pilot signal for differentiating base stations from each other in an OFDM communication system.

It is further another object of the present invention to provide an apparatus and a method for transmitting/receiving a pilot signal using a PN code and a Walsh code in an OFDM communication system.

In order to accomplish the above and other objects, according to an aspect of the present, there is provided an apparatus for transmitting reference signals in a radio communication system in which an entire frequency band is divided into a plurality of sub-frequency bands, the reference signals are transmitted through at least one of the plurality of sub-frequency bands, and data signals are transmitted the plurality of sub-frequency bands except for the at least one of the plurality of sub-frequency bands. The apparatus includes: a reference signal generator for generating the reference signals using a pseudo noise(PN) code and a Walsh code; and a selector for controlling the generated reference signals to be transmitted according to a reference signal pattern that identifies positions in the at least one of the plurality of sub-frequency bands through which the reference signals are transmitted and is generated considering a preset time and a preset bandwidth.

According to another aspect of the present invention, there is provided a method for transmitting reference signals in a radio communication system in which an entire frequency band is divided into a plurality of sub-frequency bands, the reference signals are transmitted at least one of the plurality of the sub-frequency bands, and data signals are transmitted the plurality of sub-frequency bands except for the at least one of the plurality sub-frequency bands. The method includes the steps of: determining a reference signal pattern identifying positions in the at least one of the plurality of sub-frequency bands through which the reference signals are transmitted in consideration of a preset time and a preset bandwidth; generating the reference signals using a pseudo noise(PN) code and a Walsh code; and transmitting the reference signals through the at least one of the plurality of sub-frequency bands corresponding to the reference signal pattern.

According to another aspect of the present invention, there is provided a method for transmitting reference signals in a radio communication system. The method includes the steps of: determining a reference signals position to transmit the reference signals to a receiver in consideration of a coherence time and a coherence bandwidth; generating the reference signals using a first code and a second code; and transmitting the reference signals corresponding to the reference signals position.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description of the present invention, a detailed description of known functions and configuration incorporated herein will be omitted when it may obscure the subject matter of the present invention.

As indicated above, the present invention proposes a method for generating a pilot signal for differentiating base stations from each other in a communication system using an OFDM scheme.

Figure 2:
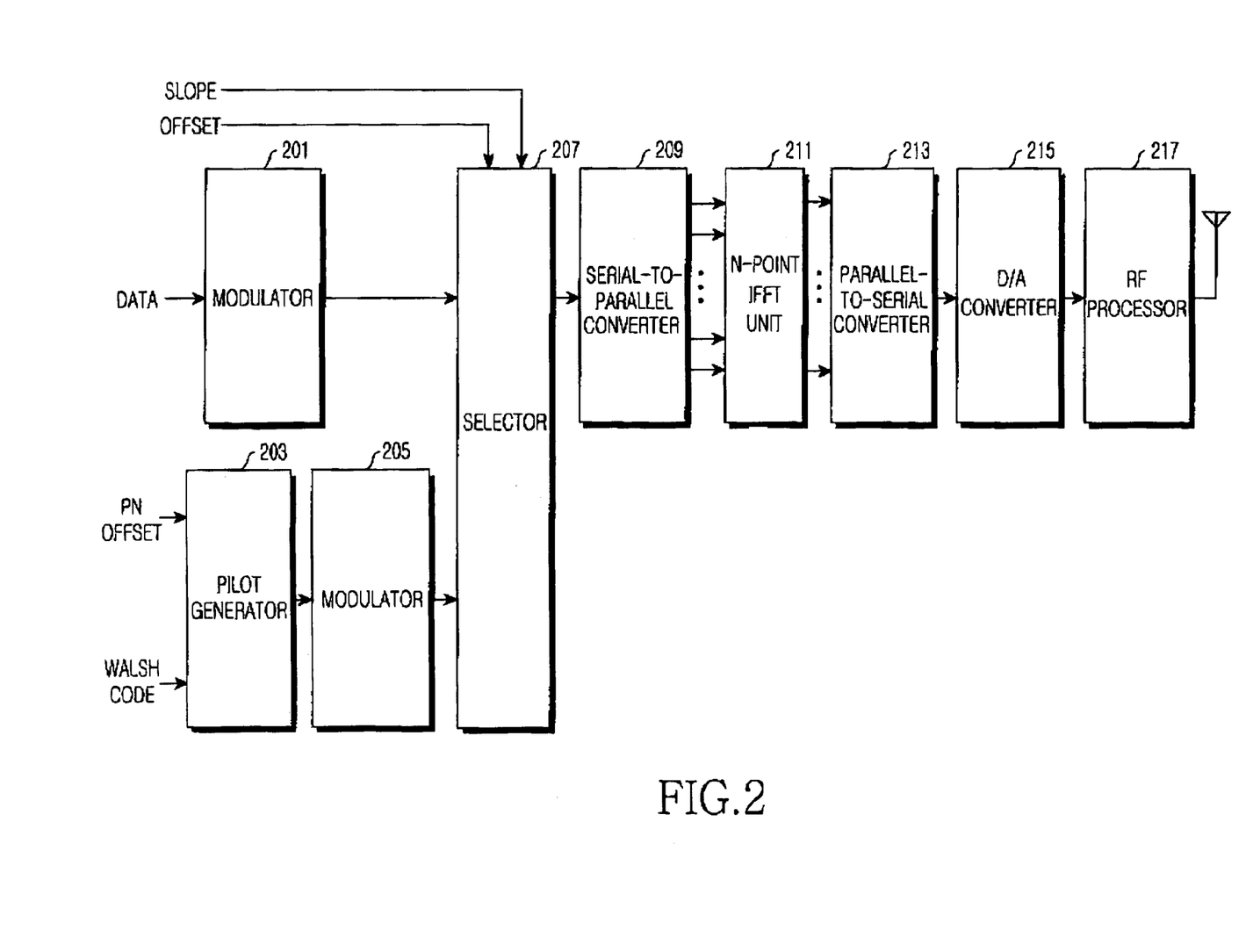
FIG. 2 is a block diagram illustrating a transmitter in an OFDM communication system according to an embodiment of the present invention.

FIG. 2 is a block diagram illustrating a transmitter in an OFDM communication system according to the present invention. Referring to FIG. 2, the transmitter includes a modulator 201, a pilot generator 203, a modulator 205, a selector 207, a serial-to-parallel converter 209, an N-point IFFT unit 211, a parallel-to-serial converter 213, a digital-to-analog (DA) converter 215, and an RF processor 217.

Data to be transmitted is input to the modulator 201. The modulator 201 modulates the data by a predetermined modulation scheme to transmit the modulated data to the selector 207. The modulation scheme may use a QPSK scheme, an 8PSK scheme, a 16QAM scheme, a 64 QAM scheme, etc. The pilot generator 203 receives pseudo noise offset (PN offset) assigned to a corresponding base station and a Walsh code, generates a pilot pattern, and sends the generated pilot signal to the modulator 205. A generation process of the pilot pattern will be described in more detail with reference to FIG. 4 later. The Walsh code is used as an identifier for differentiating each channel in a forward link, and it is used as an orthogonal modulation code for minimizing interference between adjacent data symbols in a backward link.

The modulator 205 receives the pilot pattern, modulates the pilot pattern by the predetermined modulation scheme, and transmits the modulated pilot pattern to the selector 207. The selector 207 receives a slope and a starting point of a pilot pattern assigned to a corresponding base station and determines whether a current time point is an interval for data or an interval for a pilot pattern. The offset received in the selector 207 represents an offset of a pilot pattern having a different starting point of a pilot pattern among pilot patterns having the same pilot slope. For example, in FIG. 1, in the pattern in which a pilot slope is 1, when a coherence time slot is fixed to 1 and a coherence bandwidth changes, a plurality of different pilot patterns in which a pilot slope is 1 can be generated. Herein, the pilot patterns have different offsets.

The selector 207 outputs data in a data interval and a pilot in a pilot interval and sends the data or the pilot pattern to the N-point IFFT unit 211 via the serial-to-parallel converter 209. Then, the output value of the N-point IFFT unit 211 is sent to the air through an antenna via the parallel-to-serial converter 213, the DA converter 215, and the RF processor 217.

Figure 3:
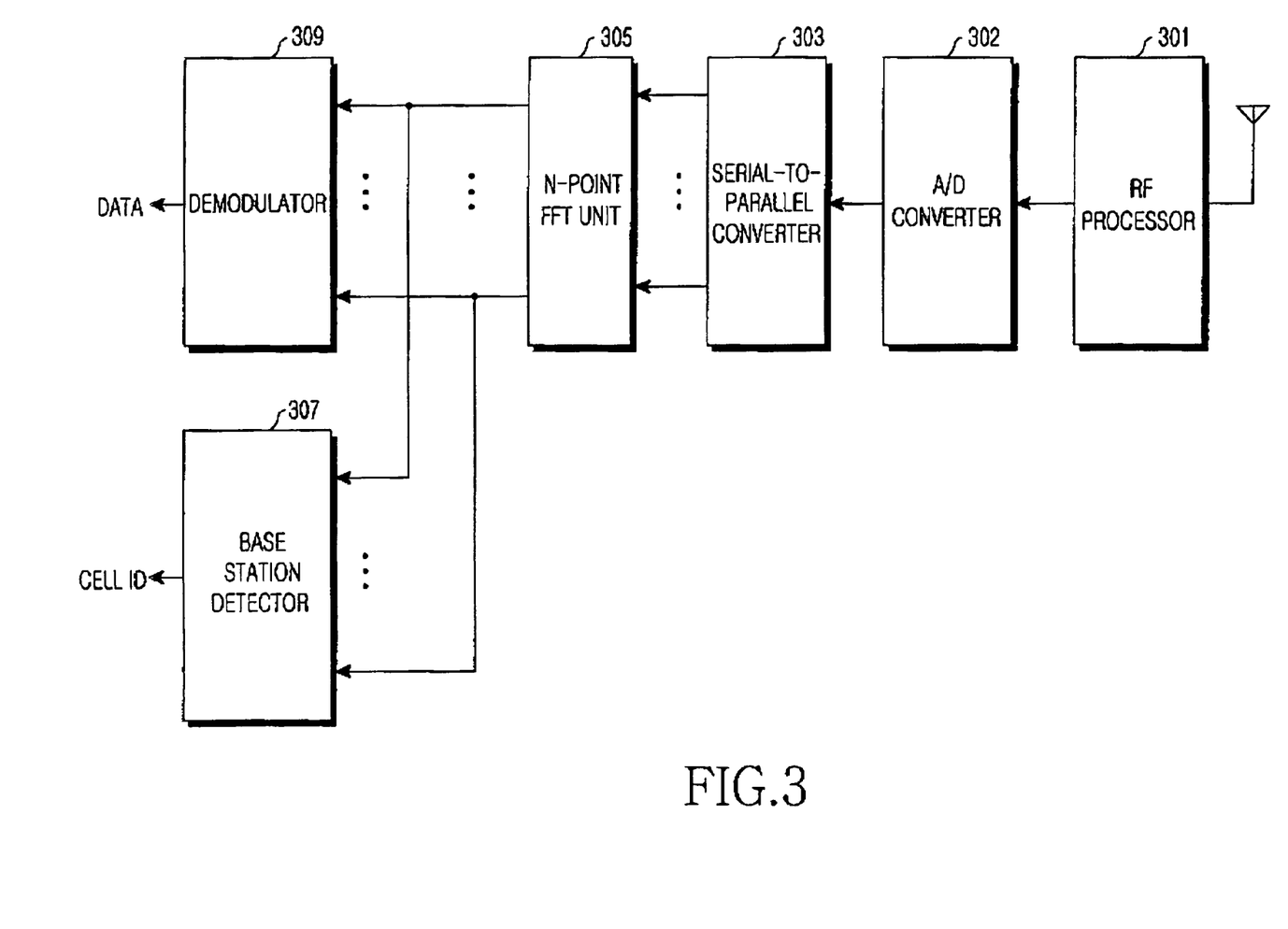
FIG. 3 is a block diagram illustrating a receiver in an OFDM communication system according to an embodiment of the present invention.

FIG. 3 is a block diagram illustrating a receiver in the OFDM communication system according to the present invention. Referring to FIG. 3, the receiver includes an RF processor 301, analog-to-digital (A/D) converter 302, a serial-to-parallel converter 303, an N-point FFT unit 305, a base station detector 307, and a demodulator 309.

A signal transmitted from the transmitter illustrated in FIG. 2 is received in the RF processor 301 through a receiver antenna. The RF processor 301 down-converts the received signal to an intermediate frequency (IF) band and outputs the down-converted signal to the A/D converter 302. The A/D converter 302 converts the received analog signal to a digital signal and outputs the digital signal to the serial-to-parallel converter 303. The serial-to-parallel converter 303 inputs the digital signal, parallel-converts the digital signal, and outputs the converted signal to the N-point FFT unit 305. The N-point FFT unit 305 performs an N-point FFT for the signal output from the serial-to-parallel converter 303, and outputs the signal to the demodulator 309 and the base station detector 307. The base station detector 307 receives the output signal of the N-point FFT unit 305, determines the slope of a pilot pattern, an offset, a PN offset, and a Walsh code, and detects a base station.

The base station detector 307 detects a base station by obtaining correlation values. That is, the base station detector 307 obtains correlation values about the slope of all pilot patterns, an offset, a PN offset and a Walsh code and selects the largest one of the obtained values. Accordingly, the receiver identifies a base station to which the receiver itself belongs by means of the value selected in this way and can determine the position of the pilot pattern and the position of the data. The demodulator 309 receives the output signal of the N-point FFT unit 305, selects only a data value, demodulates the value by a demodulation scheme corresponding to the modulation scheme of the transmitter, and restores the data.

Figure 4:
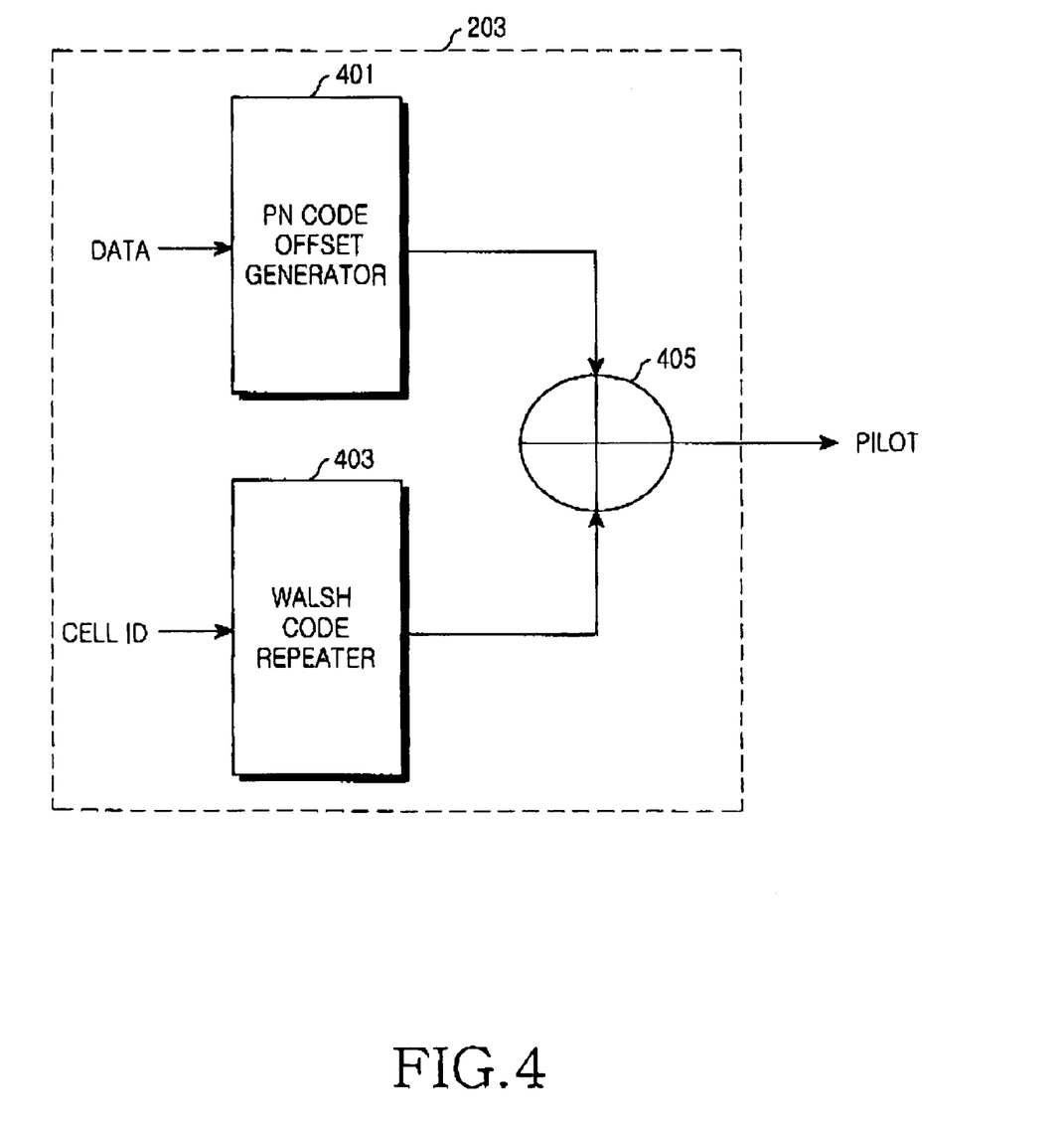
FIG. 4 is a block diagram illustrating the internal structure of the pilot generator illustrated in FIG. 2.

FIG. 4 is a block diagram illustrating the internal structure of the pilot generator 203 as illustrated in FIG. 2. Referring to FIG. 4, a PN offset assigned to each base station has a specific value according to each base station or each frame. Each base station may have different PN offsets for reducing interference between adjacent cells. A PN code offset generator 401 generates a PN code offset to output the PN code to an adder 405. When the pilot length is $N_p$, the offset PN code has a length of $N_p$.

A Walsh code repeater 403 receives a Walsh code assigned to a corresponding base station, repeats a value $N_p/N_w$ obtained by dividing the pilot length $N_p$ by a Walsh code length $N_w$, and outputs the value $N_p/N_w$ to the adder 405. The adder 405 receives the PN code offset and the value $N_p/N_w$, exclusive-ORs the two input values, and generates a pilot signal.

Figure 5:
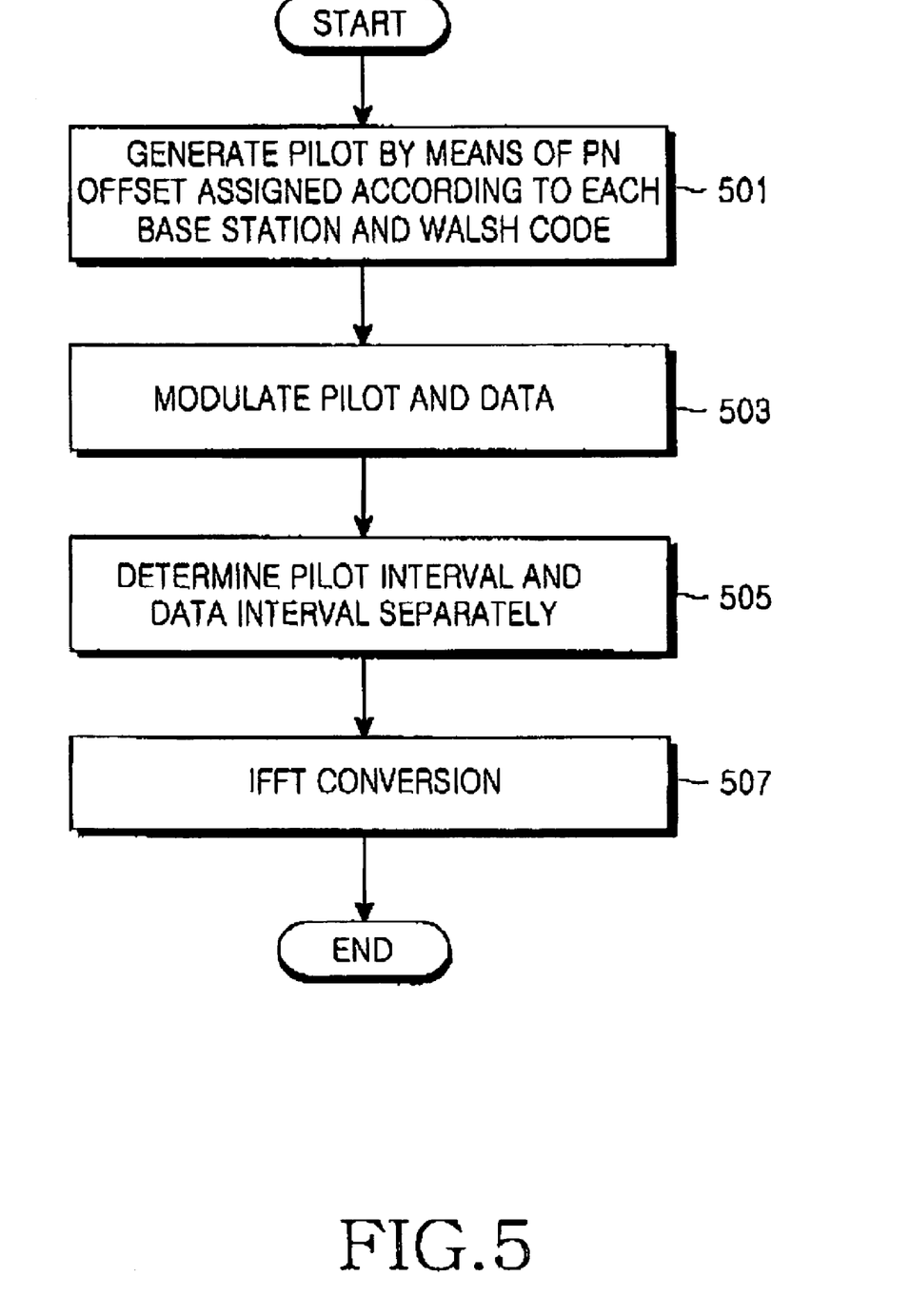
FIG. 5 is a flow chart illustrating a signal transmission process in an OFDM communication system according to an embodiment of the present invention.

FIG. 5 is a flow chart illustrating a signal transmission process in the OFDM communication system according to an embodiment of the present invention. Referring to FIG. 5, in step 501, the pilot generator 203 receives PN offsets differently assigned according to each base station and a Walsh code and generates a pilot signal. Specifically, the adder 405 of the pilot generator 203 receives the offset PN code and the Walsh code, XORs the PN code and the Walsh code, and generates the pilot signal. In step 503, data to be transmitted and the generated pilot signal are the modulators 201 and 205, respectively. The modulators 201 and 205 modulate the data and the pilot signal by a predetermined modulation scheme. In step 505, the selector 207 receives a slope and an offset (starting point of pilot signal) of a pilot signal assigned to a corresponding base station and determines whether a current time point is an interval for data or an interval for a pilot signal. Further, the selector 207 periodically selects and repeats the pilot and the data and outputs the pilot signal and the data to the serial-to-parallel converter 209. In step 507, the N-point IFFT unit 211 having received the parallel signal of the serial-to-parallel converter 209 performs an IFFT for the signal and sends the signal through the air through an antenna via the DA converter 215 and the RF processor 217.

Figure 6:
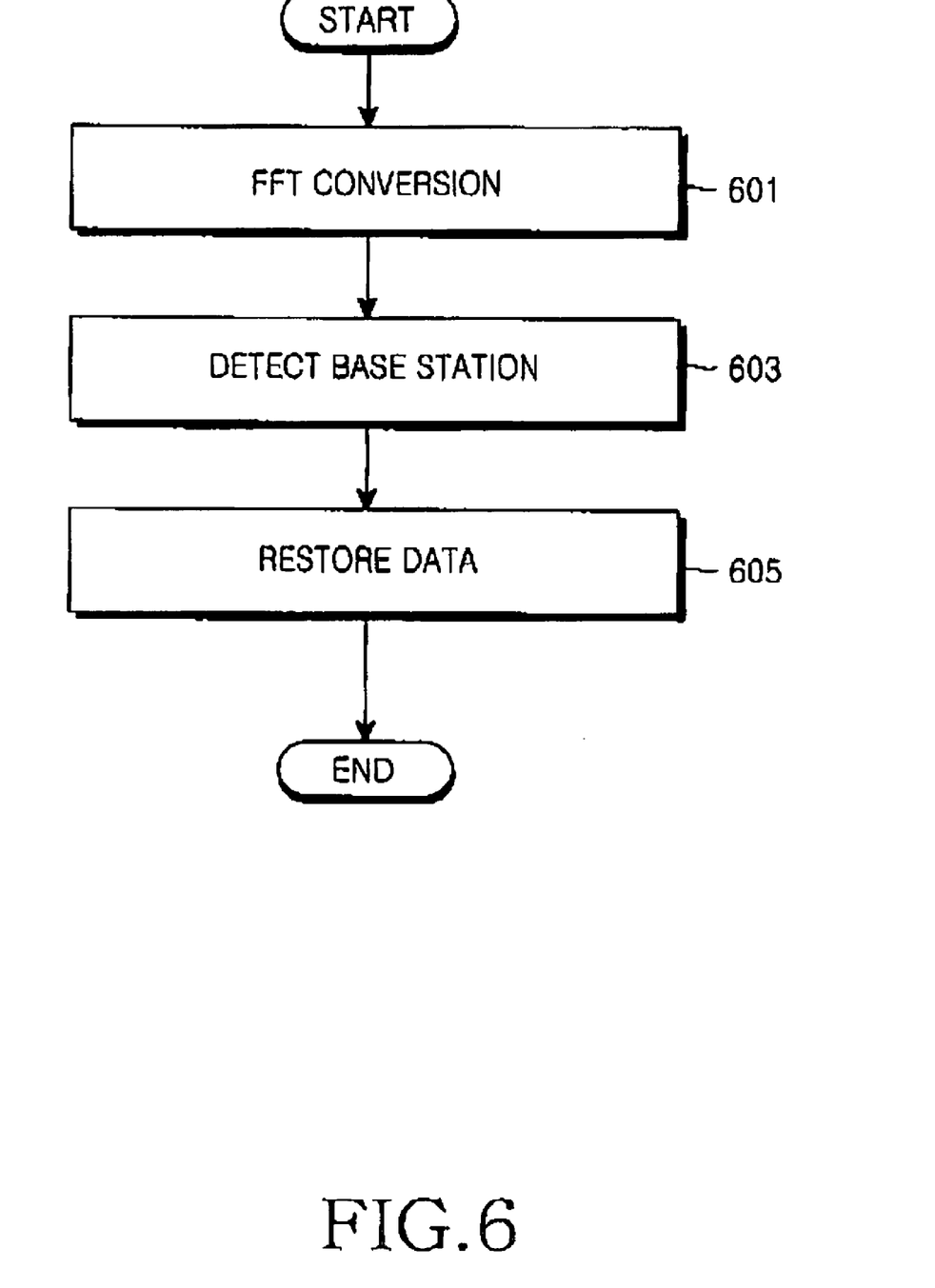
FIG. 6 is a flow chart illustrating a signal reception process in an OFDM communication system according to the present invention.

FIG. 6 is a flow chart illustrating a signal reception process in the OFDM communication system according to the present invention. Referring to FIG. 6, in step 601, the RF processor 301 down-converts the signal received through an antenna to an IF band and outputs the down-converted signal to the A/D converter 302. The A/D converter 302 converts the received analog signal to a digital signal and outputs the digital signal to the N-point FFT unit 305 via the serial-to-parallel converter 303. The N-point FFT unit 305 performs an FFT for the signal and step 603 is then performed. In step 603, the base station detector 307 determines the slope of a pilot pattern, an offset, a PN offset, and a Walsh code, and detects a corresponding base station.

In step 605, the receiver having detected the corresponding base station can determine the position of the pilot and the position of the data. The demodulator 309 receives the output signal of the N-point FFT unit 305, selects only data, demodulates the value by a demodulation scheme corresponding to the modulation scheme of the transmitter, and restores the data.

Figure 7:
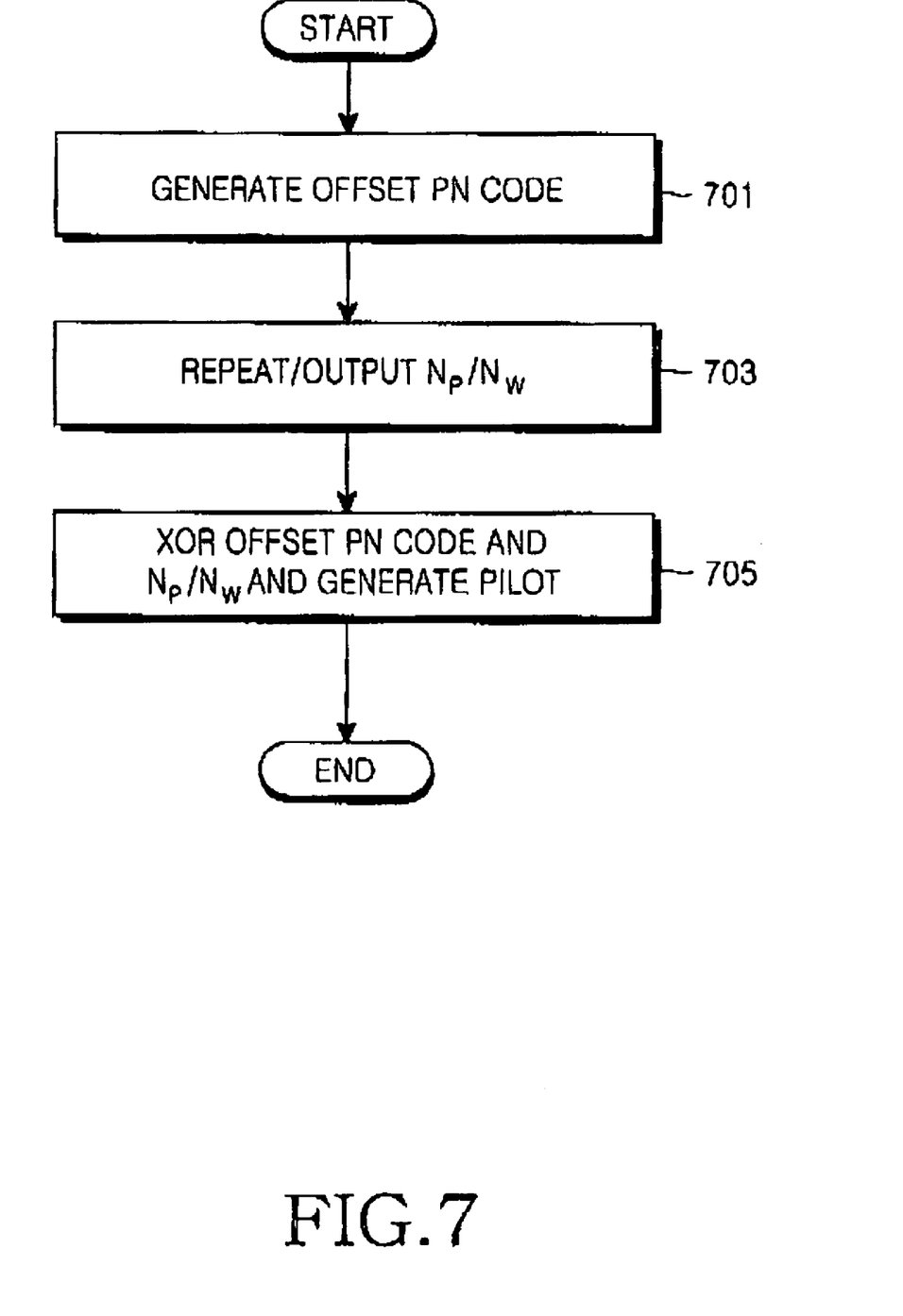
FIG. 7 is a flow chart illustrating an operation process of the pilot generator illustrated in FIG. 2.

FIG. 7 is a flow chart illustrating a process by which the pilot generator generates a pilot signal in the OFDM communication system according to the present invention. Referring to FIG. 7, in step 701, the PN code offset generator 401 receives the PN code offset value of the corresponding base station, determines the starting point of a PN code, generates the PN code, and outputs the PN code to the adder 405. Herein, the PN code offset value has been differently assigned to each base station and can be changed according to each frame even in one base station. Further, when the pilot length is $N_p$, the offset PN code has a length of $N_p$.

In step 703, the Walsh code repeater 403 receives the Walsh code assigned to the corresponding base station, and repeats and outputs a value obtained by dividing the pilot length by a Walsh code length in one frame. That is, the Walsh code repeater 403 repeats the value $N_p/N_w$ obtained by dividing the pilot length $N_p$ by the Walsh code length $N_w$, and outputs the value $N_p/N_w$ to the adder 405. In step 705, the adder 405 XORs the offset PN code output from the PN code offset generator 401 and the value $N_p/N_w$ output from the Walsh code repeater 403, and generates the pilot signal.

As described above, in the present invention, a pilot signal is generated using a PN code and a Walsh code in an OFDM communication system, thereby increasing the number of distinguishable pilot signals. Further, in the present invention, the pilot signal is generated using the PN code and the Walsh code, thereby eliminating interference between pilot signals different from each other. Therefore, interference due to pilot signals between different base stations or cells can be minimized.

Although preferred embodiments of the present invention have been described for illustrative purposes, those skilled in the art will appreciate that various modifications, additions, and substitutions are possible, without departing from the scope and spirit of the present invention as disclosed in the accompanying claims, including the full scope of equivalents thereof.

What is claimed is:

1. A method for transmitting reference signals in a radio communication system having identical reference signal patterns between adjacent cells, the method comprising the steps of:
   determining a reference signal pattern identifying positions in at least one of a plurality of sub-frequency bands through which the reference signals are transmitted in consideration of a preset time and a preset bandwidth;
   generating the reference signals using a pseudo noise (PN) code and a Walsh code; and
   transmitting the reference signals through at least one of the plurality of sub-frequency bands corresponding to the reference signal pattern,
   wherein the reference signal pattern is defined by a slope of the reference signal and a starting point at which the reference signal is transmitted.

2. The method as claimed in claim 1, wherein the reference signal is a signal obtained by XORing the PN code and the Walsh code.

3. The method as claimed in claim 1, wherein the preset bandwidth represents a maximum bandwidth in which a channel state is not changed on a frequency domain.

4. The method as claimed in claim 1, wherein the preset time represents a maximum time for which a channel is not changed on a time domain.

5. An apparatus for transmitting reference signals in a radio communication system having identical reference signal patterns between adjacent cells, the apparatus comprising:
   a reference signal generator for generating the reference signals using a pseudo noise (PN) code and a Walsh code; and
   a selector for controlling the generated reference signals to be transmitted according to a reference signal pattern that identifies positions in at least one of a plurality of sub-frequency bands through which the reference signals are transmitted and is generated considering a preset time and a preset bandwidth,
   wherein the reference signal pattern is defined by a slope of the reference signal and a starting point at which the reference signal is transmitted.

6. The apparatus as claimed in claim 5, wherein the reference signal is a signal obtained by XORing the PN code and the Walsh code.

7. The apparatus as claimed in claim 5, wherein the preset bandwidth represents a maximum bandwidth in which a channel state is not changed on a frequency domain.

8. The apparatus as claimed in claim 5, wherein the preset time represents a maximum time for which a channel is not changed on a time domain.

9. The apparatus as claimed in claim 5, wherein the reference signal generator includes a PN code offset generator generating a PN code offset for preventing interference between adjacent cells.

10. The apparatus as claimed in claim 5, wherein the reference signal generator includes a Walsh code repeater for inputting a cell identifier (ID) and repeating a Walsh code corresponding to the cell identifier (ID).

11. In a multi-carrier communication system having identical reference signal patterns between adjacent cells, a method comprising:
    determining reference signals position to transmit reference signals to a receiver in consideration of a coherence time and a coherence bandwidth;
    generating the reference signals using a first code and a second code; and
    transmitting the reference signals corresponding to the reference signals position,
    wherein the reference signal patterns are defined by a slope of the reference signal and a starting point at which the reference signals are transmitted.

12. The method of claim 11, wherein the first code is a pseudo noise (PN) code.

13. The method of claim 11, wherein the second code is a Walsh code.

* * * * *